Figure 1:
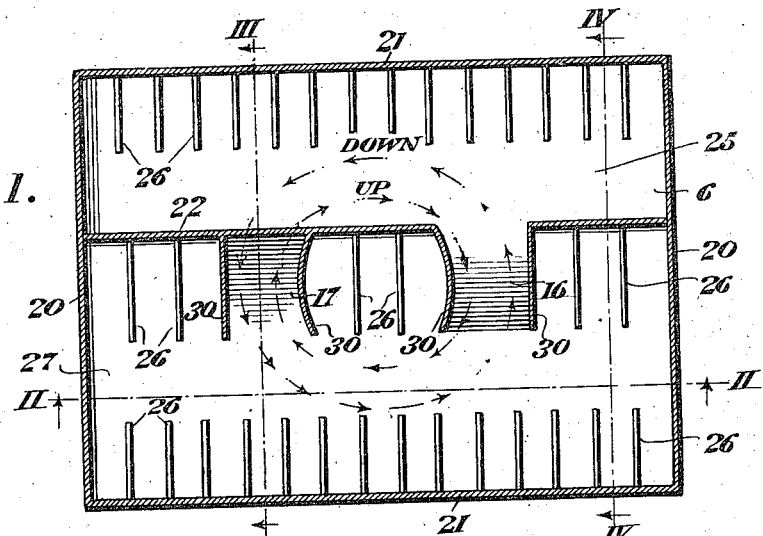

F. E. D'HUMY.
STORAGE BUILDING.
APPLICATION FILED JUNE 26, 1920.

1,379,970.

Patented May 31, 1921.
2 SHEETS—SHEET 1.

Inventor
Fernand E. d'Humy
By Davies Davies
Attorneys

F. E. D'HUMY.
STORAGE BUILDING.
APPLICATION FILED JUNE 26, 1920.
1,379,970.
Patented May 31, 1921.
2 SHEETS—SHEET 2.
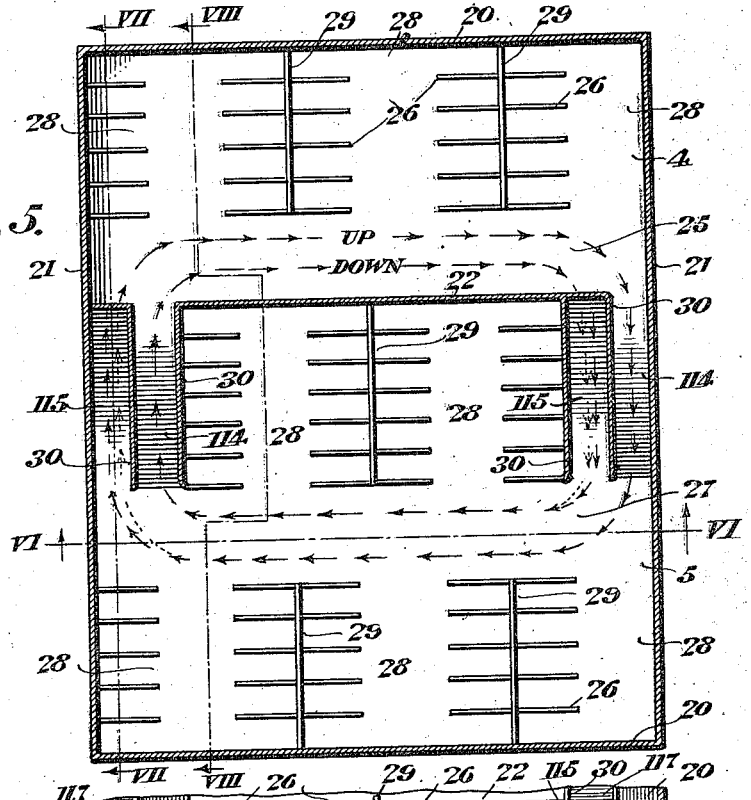
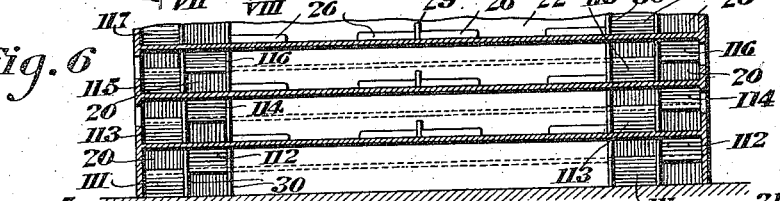
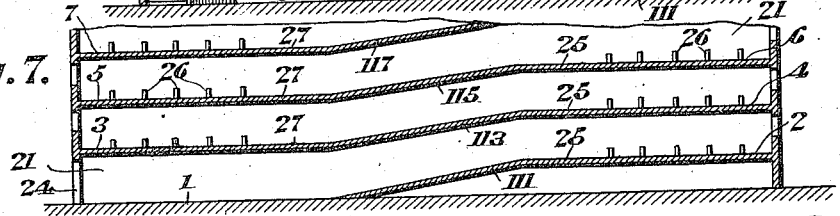
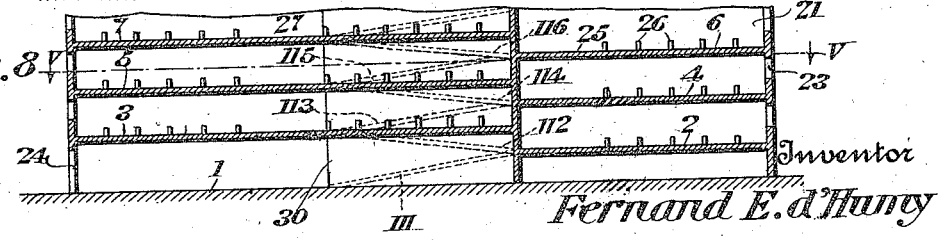
Inventor
Fernand E. d'Humy
By
Attorneys

UNITED STATES PATENT OFFICE.

FERNAND E. D'HUMY, OF ENGLEWOOD, NEW JERSEY, ASSIGNOR TO RAMP BUILDINGS CORPORATION, OF NEW YORK, N. Y., A CORPORATION OF DELAWARE.

STORAGE-BUILDING.

1,379,970.  Specification of Letters Patent.  Patented May 31, 1921.

Application filed June 26, 1920. Serial No. 392,127.

*To all whom it may concern:*

Be it known that I, FERNAND E. D'HUMY, a citizen of the United States, and resident of Englewood, county of Bergen, and State of New Jersey, have invented certain new and useful Improvements in Storage-Buildings, of which the following is a specification.

This invention relates to improvements in storage buildings, and has for its object to provide a building so constructed as to facilitate the travel of vehicles from floor to floor thereof and to provide a maximum storage space on the several floors. The improvements are especially applicable to garages or buildings for storing motor or other vehicles, but it will be obvious that buildings constructed in accordance with the invention may be utilized for various purposes.

Figure 2:
Figure 3:
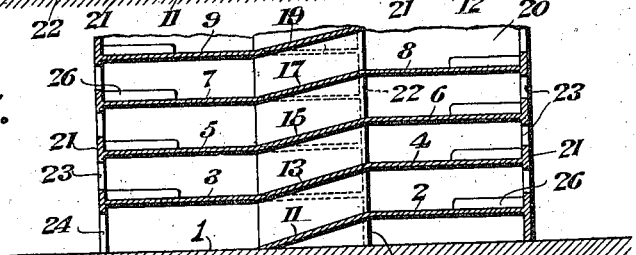
Figure 4:
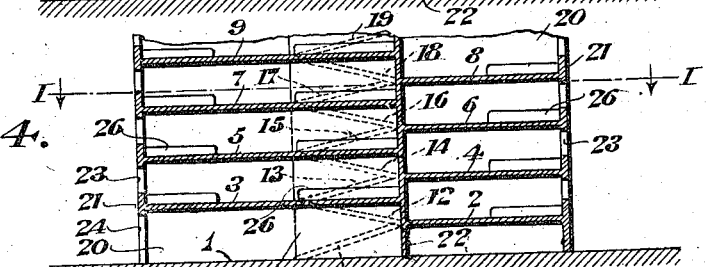

In the drawings:

Figure 1 is a horizontal section on the line I—I of Fig. 4 illustrating one form of building embodying the invention;

Fig. 2 a vertical section on the line II—II of Fig. 1;

Fig. 3 a vertical section on the line III—III of Fig. 1;

Fig. 4 a vertical section on the line IV—IV of Fig. 1;

Fig. 5 a horizontal section on the line V—V of Fig. 8 illustrating another building structure embodying the invention;

Fig. 6 a vertical section on the line VI—VI of Fig. 5;

Fig. 7 a vertical section on the line VII—VII of Fig. 5; and

Fig. 8 a vertical section on the line VIII—VIII of Fig. 5.

Referring to the construction shown in Figs. 1 to 4, 20 designates the end walls and 21 the side walls of the building, and 22 designates an intermediate partition or dividing wall. The outer walls are provided with suitable window openings 23 and also with suitable doorways 24 giving access to the ground floor 1 of the building. The floors are arranged in two groups or series, the series of floors 1, 3, 5, 7, 9, etc., at one side of the wall 22 being located in planes midway between the planes of the floors 2, 4, 6, 8, etc., at the opposite side of wall 22.

The two groups of floors are connected with each other by two series of ramps, the ramps 11, 13, 15, 17, 19, etc., of one series being inclined oppositely to the ramps 12, 14, 16, 18, etc., of the other series. The ramp 11 connects floors 1 and 2, ramp 12 connects floors 2 and 3, ramp 13 connects floors 3 and 4, and so on up through the building. It will be obvious that the groups of ramps may be located at various points in the building, for instance at opposite ends of the building. As shown, the two sets of ramps are spaced apart from each other and also spaced from the ends of the buildings. It will be observed that both sets of ramps are located wholly at one side of the dividing wall 22 so that the group of floors at the opposite side of said wall are unbroken, the ramps extending from points intermediate the inner and outer edges of floors 1, 3, 5, etc., to points at the inner edges of the floors 2, 4, 6, etc., in alinement with the dividing wall. The dividing wall is provided with openings, passages or doorways at the end of the ramps.

Each of the floors 2, 4, 6, etc., is provided with a passage or driveway 25 along the dividing wall connecting the two ramps which communicate with that floor. The remainder of the space on these floors may be variously utilized. For narrow buildings, such as shown in Figs. 1 to 4, I prefer to extend the passage 25 the entire length of the wall 22 and arrange compartments, rooms, stalls, or the like, along the outer side of the passage. I have shown the storage space divided into compartments or stalls by low partitions 26. Each floor 3, 5, 7, etc., and floor 1, if desired, may be provided with stalls or compartments at opposite sides of a central longitudinal passage-way 27, as shown, said passage connecting the two ramps communicating with that floor.

In Figs. 5 to 8, I have shown a construction particularly adapted for large buildings, the arrangement of the ramps being such that two lines of vehicles forming ascending and descending streams of traffic may travel around and around in the same direction from floor to floor in concentric paths, thus permitting large numbers of vehicles to travel quickly toward and from their storage spaces at the same time without confusion and reducing the liability of collision to a minimum. In this construction four series of ramps are provided. As shown two series of ramps are located at each end of the dividing wall 22. but it will be obvious that the arrangement of the different series of ramps relatively to each other and to the outer walls 21 may be varied if desired. One series of ramps 111, 113, 115, 117, etc., is located adjacent one side wall 21 and at the inside of this series of ramps is a series of oppositely inclined ramps 112, 114, 116, etc. This arrangement is duplicated at the opposie end of the dividing wall, the duplicate series of ramps 112, 114, 116, etc., being, however, located adjacent the outer wall 21 outside of the duplicate series of ramps 111, 113, 115, etc. All four series of ramps are located at one side of the dividing wall 22 and the ramps communicate at one end with the central longitudinal passages or driveways 27 on the odd-numbered floors and at their other ends with the passages or driveways 25 on the even-numbered floors, these latter driveways extending along the dividing wall and communicating with the ramps through suitable openings, doorways or passages in said wall. In the construction shown in Figs. 5 to 8, I have divided the storage spaces on the floors into stalls or compartments opening on corridors or passages 28 extending at right angles to the dividing wall 22, the corridors being separated by low walls or partitions 29. It will be obvious, however, that the storage space may be utilized and sub-divided in various ways. It will also be obvious that if one line of vehicles travels from floor to floor by way of the two outermost series of ramps and another line of vehicles travels from floor to floor by way of the two inner series of ramps, ascending and descending lines of vehicles may travel in the same direction without interference on the different floors.

I have shown vertical guard walls 30 along the side edges of the ramps but it will be obvious that guard rails or other suitable protecting means may be substituted for the walls 30. It will be obvious also that the "dividing wall" may be a solid wall with openings or doorways at the ends of the ramps, as shown, or may be any other suitable form of structural supporting means for the closely adjacent edges of the two groups of floors, such as a skeleton metallic structure or a series of columns.

One great advantage of locating the ramps entirely on one side of the dividing wall between the two groups of floors, is that one group of floors will be entirely unobstructed and may be framed up and built in a simple standard form. The framing for the ramp openings will be wholly within one series or group of floors. This will simplify the construction of the building and at the same time conserve storage space. It is manifest that by locating the ramps wholly on one side of the dividing wall between the groups of floors the construction of the entire building will be materially simplified, and consequently cheapened.

What I claim is:

1. A building structure comprising outer walls, a group of superposed floors overlying a part of the ground area within the outer walls, a second group of superposed floors lying in planes intermediate the planes of the first series of floors and overlying another part of the ground area within the outer walls, and four vertical series of ramps located wholly over that part of the ground area within the vertical planes of the edges of one group of floors, two ramps of two different series of ramps connecting each floor of the first group with the next higher floor of the second group and two ramps of the remaining two series connecting each floor of the first group with the next lower floor of the second group, each of said floors having a passage between the ends of the ramps communicating therewith and said four series of ramps being so arranged relatively to each other that up and down streams of traffic may move in the same direction and in different zones from floor to floor.

2. A building structure comprising outer walls, a series of superposed floors overlying a part of the ground area within the walls, a second series of superposed floors lying in planes intermediate the planes of the first series of floors and overlying another part of the ground area within the outer walls, two vertical series of similarly inclined ramps one of each of which series of ramps extends from a point within the edges of one of the first series of floors to the adjacent edge of the next higher one of the second series of floors, and two vertical series of ramps inclined oppositely to the first-mentioned ramps one of each of which series of ramps extends from a point within the edges of one of the first series of floors to the adjacent edge of the next lower one of the second series of floors, the floors of the first series each having a passage between the ends of the ramps communicating therewith and storage space at both sides of the passage and the floors of the second series having a passage between the ends of the ramps communicating therewith and storage space at one side only of said passage, said four series of ramps being so arranged relatively to each other that up-and-down traffic may move in the same direction and in separate zones.

3. A building structure comprising outer walls, two series of superposed floors overlying different parts of the ground area within the walls with the floors of one series in planes intermediate the planes of the floors of the other series, and four vertical series of ramps connecting the two series of floors and all located wholly within the vertical planes of the edges of one series of floors, the ramps of two of said series of ramps being inclined oppositely to the ramps of the other two series and said four series of ramps being arranged so that series of ramps of opposite inclination alternate with each other, each floor of each series having a passageway connecting the ends of the ramps which communicate therewith and storage space thereon.

4. A building structure comprising outer walls, two series of superposed floors overlying different parts of the ground area within the walls, the floors of one series lying in planes intermediate the planes of the floors of the other series, a dividing wall between the two series of floors, and four vertical series of ramps connecting the two series of floors located at one side of the dividing wall and grouped in pairs spaced apart along the wall, the two series of ramps forming each group being of opposite inclination, each floor of one series having a passage along the dividing wall between the two groups of ramps and storage space at the outer side of said passage and each floor of the other series having a passage between the ends of the two groups of ramps and storage space between the two groups of ramps and at the outer side of the passage, the dividing wall having openings therein at the ends of the ramps.

5. A building comprising outer walls, two closely adjacent groups of floors overlying two different parts of the ground area within the walls, the floors of one group being located in planes intermediate the planes of the floors of the other group, and two series of ramps connecting the two groups of floors located wholly within the vertical planes of the edges of one group of floors, the ramps of one series being inclined oppositely to the ramps of the other series so that two oppositely inclined ramps extend from points within the outer edges of each floor of one group to points at the adjacent edges of the next higher and lower floors of the other group, each floor having a passage connecting the ends of the ramps communicating therewith.

6. A building comprising outer walls, two closely adjacent groups of floors overlying different parts of the ground area within the walls, the floors of one group being located in planes intermediate the planes of the floors of the other group, and two vertical series of ramps connecting the two groups of floors located wholly within the vertical planes of the edges of one group of floors, the ramps of one series being inclined oppositely to the ramps of the other series and each floor of both groups having a passage communicating with the ends of the ramps, one group of floors having storage space at both sides of the passages thereon and the other group of floors having storage space at one side only of the passages thereon.

In testimony whereof I hereunto affix my signature.

FERNAND E. D'HUMY.